United States Patent
Ishikawa et al.

(10) Patent No.: US 6,945,904 B2
(45) Date of Patent: Sep. 20, 2005

(54) TOROIDAL-TYPE CONTINUOUSLY VARIABLE TRANSMISSION

(75) Inventors: Kouji Ishikawa, Kanagawa (JP); Yutaka Sato, Kanagawa (JP)

(73) Assignee: NSK Ltd., Tokyo (JP)

( * ) Notice: Subject to any disclaimer, the term of this patent is extended or adjusted under 35 U.S.C. 154(b) by 20 days.

(21) Appl. No.: 10/345,335

(22) Filed: Jan. 16, 2003

(65) Prior Publication Data

US 2003/0134711 A1 Jul. 17, 2003

(30) Foreign Application Priority Data

Jan. 17, 2002 (JP) .................................... P.2002-008349

(51) Int. Cl.[7] ............................................. F16H 15/38
(52) U.S. Cl. .......................................... 476/40; 476/46
(58) Field of Search ............................... 476/40, 46, 42

(56) References Cited

U.S. PATENT DOCUMENTS

| | | | |
|---|---|---|---|
| 5,391,126 A | 2/1995 | Fukushima et al. | |
| 5,575,736 A | 11/1996 | Takemura | |
| 5,580,328 A | 12/1996 | Aramaki | |
| 6,152,850 A | * 11/2000 | Inoue et al. | 476/46 |

FOREIGN PATENT DOCUMENTS

| | | |
|---|---|---|
| JP | 4-96654 U | 8/1992 |
| JP | 6-40501 U | 2/1994 |
| JP | 6-16753 U | 3/1994 |
| JP | 7-243492 | 9/1995 |
| JP | 7-243495 | 9/1995 |
| JP | 8-178007 | 7/1996 |
| JP | 11-51139 | 2/1999 |
| JP | 11-94041 | 4/1999 |
| JP | 2001-263442 | 9/2001 |
| JP | 2001-304366 | 10/2001 |

* cited by examiner

*Primary Examiner*—William C. Joyce
(74) *Attorney, Agent, or Firm*—Sughrue Mion, PLLC

(57) ABSTRACT

A toroidal-type continuously variable transmission has: an input shaft; an input disk and an output disk; a displacement shaft having a support shaft portion and a pivotal shaft portion; a trunnion having a support hole for supporting the support shaft portion; a first radial bearing supporting the support shaft portion within the support hole; a power roller having an insertion hole for receiving the pivot shaft portion; a second radial bearing supporting the pivot shaft portion within the insertion hole; and a thrust bearing including an outer ring and rolling elements, wherein a first bottom plate portion is provided at the support hole so as to close an opening of the support hole, a second bottom plate portion is provided at the insertion hole so as to close an opening of the insertion hole; and the displacement shaft and the outer ring are formed integrally with each other.

2 Claims, 4 Drawing Sheets

FIG. 4       PRIOR ART

TOROIDAL-TYPE CONTINUOUSLY VARIABLE TRANSMISSION

BACKGROUND OF THE INVENTION

1. Field of the Invention

This invention relates to a toroidal-type continuously variable transmission.

2. Prior Art

FIGS. 3 and 4 show one example of known toroidal-type continuously variable transmissions. An input disk 2 and an output disk 4 are rotatably supported on an input shaft 15 of a round tubular shape through respective needle roller bearings 16. A cam plate 10 is engaged with an outer peripheral surface of an end portion (left end portion in FIG. 3) of the input shaft 15 through splines, and is prevented by a flange portion 17 from moving away from the input disk 2. The cam plate 10 and rollers 12 jointly form a pressing device 9 of the loading cam-type which rotates the input disk 2 in accordance with the rotation of the input shaft 15, while pressing the input disk 2 toward the output disk 4. An output gear 18 is coupled to the output disk 4 by a key 19 so that the output disk 4 and the output gear 18 can synchronously rotate.

Power rollers 8 are held between the input disk 2 and the output disk 4, and the power rollers 8 are supported by a pair of trunnions 6 each swingable about pivot shafts 5 located in a twisted position relative to the input shaft 15. Opposite ends of each of the two trunnions 6 are supported respectively by a pair of support plates 20 in such a manner that the trunnion can be swung, and can be displaced in an axial direction (direction perpendicular to the sheet of FIG. 3; left-right direction in FIG. 4) A displacement-shaft 7 is supported in a support hole 23 of a circular shape formed in each trunnion 6. Each of the displacement shafts 7 has a support shaft portion 21 and a pivot shaft portion 22 which are parallel to each other, and are eccentric with respect to each other.

The support shaft portion 21 is rotatably supported in the support hole 23 through a radial needle roller bearing (first radial bearing) 24. The pivot shaft portion 22 projects from an inner surface 6a of the trunnion 6, and is inserted in an insertion hole 8b formed in the power roller 8. The power roller 8 is rotatably supported on the pivot shaft portion 22 through a radial needle roller bearing (second radial bearing) 25.

The pair of displacement shafts 7 are disposed respectively at diametrically-opposite (180 degrees spaced) positions with respect to the input shaft 15. The pivot shafts portions 22 of the displacement shafts 7 are eccentric with respect to their respective support shaft portions 21 in the same direction (opposite (right and left) directions in FIG. 4) with respect to the direction of rotation of the input and output disks 2 and 4. This direction of eccentricity is substantially perpendicular to the direction of extending of the input shaft 15. Therefore, each power roller 8 is supported in such a manner that it can be displaced slightly along the direction of extending of the input shaft 15. Therefore, even when each power roller 8 tends to be displaced in the axial direction of the input shaft 15 (that is, the left-right direction in FIG. 4; a direction perpendicular to the sheet of FIG. 5) due to variations in dimensional accuracy of the component parts, resilient deformation thereof and so on, this displacement can be absorbed without exerting an undue force on the component parts.

Provided between an outer surface of each power roller 8 and the inner surface 6a of the trunnion 6 are a thrust bearing 26 and a thrust needle roller bearing 27 (which supports a thrust load acting on an outer ring 30) which are arranged in this order from the outer surface of the power roller 8. The thrust bearing 26, while bearing a thrust load acting on the power roller 8, allows the rotation of the power roller 8.

The thrust bearing 26 comprises a plurality of balls (rolling elements) 29, and an annular retainer 28, holding the balls 29 in a manner to allow the rotation of these balls 29, and the annular outer ring 30. An inner ring raceway of the thrust bearing 26 is formed at the outer surface of the power roller 8, and an outer ring raceway thereof is formed at an inner surface of the outer ring 30.

Each thrust needle roller bearing 27 comprises a race 31, a retainer 32, and needle rollers 33. The race 31 and the retainer 32 are combined together in such a manner that they can be displaced slightly along the rotating direction. The thrust needle roller bearing 27 is held between the inner surface of the trunnion 6 and the outer surface of the outer ring 30, with the race 31 held in contact with the inner surface of the trunnion 6. The thrust needle roller bearing 27, while bearing a thrust load applied from the power roller 8 to the outer ring 30, allows the pivot shaft portion 22 and the outer ring 30 to swing about the support shaft portion 21.

A drive rod 36 is connected to one end portion (left end portion in FIG. 4) of each trunnion 6, and a drive piston 37 is fixedly mounted on an outer peripheral surface of this drive rod 36 intermediate opposite ends thereof. The drive piston 37 is fitted in a drive cylinder 38 in an oil-tight manner.

In the toroidal-type continuously variable transmission of the above construction, the rotation of the input shaft 15 is transmitted to the input disk 2 via the pressing device 9. Then, the rotation of this input disk 2 is transmitted to the output disk 4 via the pair of power rollers 8, and further the rotation of this output disk 4 is taken out from the output gear 18.

For changing the rotational speed ratio between the input shaft 15 and the output gear 18, the pair of drive pistons 37 are displaced in opposite directions, respectively. In accordance with the displacement of the pair of drive pistons 37, the pair of trunnions 6 are displaced in opposite directions, respectively, and for example the lower power roller 8 (FIG. 4) is displaced right (FIG. 4) while the upper power roller 8 is displaced left. As a result, the direction of a tangential force, acting on an area of contact between a traction surface 8a of each power roller 8 and an inner surface 2a of the input disk 2, as well as the direction of a tangential force acting on an area of contact between the traction surface 8a and an inner surface 4a of the output disk 4, is changed. As a result of this change of the direction of the force, the trunnions 6 are swung respectively in opposite directions about their pivot shafts 5 pivotally supported by the support plates 20. As a result, the position of contact between the traction surface 8a of each power roller 8 and the inner surface 2a (4a) is changed, so that the rotational speed ratio between the input shaft 15 and the output gear 18 is changed.

When the rotational force is thus transmitted from the input shaft 15 to the output gear 18, each power roller 18 is displaced in the axial direction of the input shaft 15 in accordance with the resilient deformation of the component parts, and each displacement shaft 7, pivotally supporting the power roller 8, is angularly moved slightly about the support shaft portion 21. As a result of this angular movement, the outer surface of the outer ring 30 of each thrust ball bearing 26 and the inner surface of the trunnion 6 are displaced relative to each other. Since the thrust needle roller bearing 27 is provided between this outer surface and this inner surface, a force, required for this relative displacement, is small. The force, required for changing the angle of inclination of each displacement shaft 7 as described above, is small.

In the toroidal-type continuously variable transmission, the transmission of the power between the input disk 2 (the output disk 4) and the power rollers 8 is thus effected by the traction drive. Therefore, it is necessary to apply a large pressing force to the point of contact (abutment) between the input disk 2 (the output disk 4) and each power roller 8. In order to produce this pressing force, there is, in many cases, used the above-mentioned pressing device 9 of the loading cam-type for producing the pressing force proportional to the input torque, a hydraulic pressing device (for producing an optimum pressing force) or the like.

When the input disk 2 is pressed toward the output disk 4 by the pressing device 9 upon driving of the toroidal-type continuously variable transmission, the pressing force and the traction force (tangential force) act on the point of contact of each power roller 8 with the input disk 2 and also on the point of contact of the power roller 8 with the output disk 4, so that a load acts on each power roller 8. Because of this load, the power roller 8 is deformed as indicated in broken lines in FIG. 5, so that the insertion hole 8b in the power roller 8 is also deformed.

Therefore, the inner peripheral surface of the insertion hole 8b in the power roller 8 is inclined with respect to the radial needle roller bearing 25, that is, the radial needle roller 25 is locally contacted with the inner peripheral surface of the insertion hole 8b. As a result, the resistance of the radial needle roller bearing 25 to the insertion hole 8b (that is, the rolling resistance of the radial needle roller bearing 25) increases, so that a power transmission loss at the radial needle roller bearing 25 increases.

And besides, as a result of deformation of the power roller 8, the inner ring raceway of the thrust bearing 26, formed at the outer peripheral portion of the power roller 8, is deformed. Therefore, a load, acting on the balls 29 of the thrust bearing 26, becomes uneven, so that the power transmission loss at the thrust bearing 26 increases.

In addition, when each displacement shaft 7 is inclined by the above traction force, a radial load acts on the balls 29 of the thrust bearing 26. Therefore, the smooth rotation of the balls 29 is prevented, so that the power transmission loss at the thrust bearing 26 increases.

Furthermore, a component of the above pressing force in the thrust direction acts on each trunnion 6, so that the trunnion 6 is resiliently deformed by this component. Therefore, the outer ring 30, supported on the trunnion 6 through the thrust needle roller bearing 27, is inclined, so that the load, acting on the balls 29 of the thrust bearing 26, becomes uneven, thus preventing the smooth rotation of the balls 29. And besides, the support hole 23 in the trunnion 6 is also deformed in accordance with the resilient deformation of the trunnion 6, and therefore the contact of the radial needle roller bearing 24 (provided in the support hole 23 in the trunnion 6) with the support shaft portion 21 of the displacement shaft 7 becomes uneven, so that the resistance of the radial needle roller bearing 24 to the support shaft portion 21 increases. Therefore, the power transmission loss at the radial needle roller bearing 24 provided in the support hole 23 in the trunnion 6, as well as the power transmission loss at the thrust bearing 26, increases.

Thus, in the conventional toroidal-type continuously variable transmission, the deformation of the power rollers 8, the inclination of the displacement shafts 7 and the deformation of the trunnions 6 occur at the time of driving this transmission, and therefore the smooth rotation of the bearings 24, 25 and 26 is prevented. As a result, the power transmission loss at each of the bearings 24, 25 and 26 increases, so that the power transmission efficiency is lowered.

SUMMARY OF THE INVENTION

This invention has been made under the above circumstances, and an object of the present invention is to provide a toroidal-type continuously variable transmission which can enhance the power transmission efficiency.

The above object has been achieved by a toroidal-type continuously variable transmission of the present invention of a first aspect which has: an input shaft; an input disk and an output disk each having inner surface and concentrically mounted on the input shaft so as to rotate relative to each other, inner surfaces thereof being opposed to each other; a displacement shaft having a support shaft portion and a pivotal shaft portion, the support shaft-portion and the pivotal: shaft portion are eccentric each other; a trunnion having a support hole for rotatably supporting the support shaft portion of the displacement shaft, and swinging about a pivot shaft disposed in a twisted position with respect to the input shaft; a first radial bearing rotatably supporting the support shaft portion of the displacement shaft within the support hole of the trunnion; a power roller having an insertion hole for receiving the pivot shaft portion of the displacement shaft, and disposed between the input disk and the output disk; a second radial bearing rotatably supporting the pivot shaft portion within the insertion hole of the power roller; and a thrust bearing including an outer ring disposed between the power roller and the trunnion, and rolling elements held between the outer ring and the power roller, and bearing a thrust load acting on the power roller, wherein a first bottom plate portion is provided at the support hole of the trunnion so as to close an opening of the support hole; wherein a second bottom plate portion is provided at the insertion hole of the-power roller so as to close an opening of the insertion hole; and wherein the displacement shaft and the outer ring are formed integrally with each other.

In the present invention of the first aspect, there is provided the first bottom plate portion which closes the opening in the support hole in the trunnion, and therefore as compared with the case where the support hole is in the form of a through hole, the deformation of the trunnion is suppressed at the time of driving the transmission, and therefore the outer ring is less liable to be inclined. Therefore, a load, acting on the rolling elements of the thrust bearing, is substantially uniform, and the rolling elements of the thrust bearing rotate smoothly, so that a power transmission loss at the thrust bearing decreases. As a result, the transmission of the power by the thrust bearing is effected smoothly.

And besides, the deformation of the support hole is also suppressed as a result of suppression of the deformation of the trunnion, and therefore the first radial bearing, provided in this support hole, and the support shaft portion of the displacement shaft, supported by this first radial bearing, are kept substantially parallel to each other, so that the first radial bearing uniformly contacts the support shaft portion of the displacement shaft. Therefore, a resistance of the first radial bearing to the support shaft portion is reduced, so that the power transmission loss at the first radial bearing decreases. As a result, the transmission of the power by the first radial bearing is effected smoothly.

In the present invention, there is provided the second bottom plate portion which closes the opening in the insertion hole in the power roller, and therefore as compared with the conventional power roller having the insertion hole in the form of a through hole, the deformation of the power roller is suppressed at the time of driving the transmission. Therefore, the load, acting on the rolling elements (which are supported by the power roller and the outer ring) is substantially uniform, so that the power transmission loss at the thrust bearing decreases.

And besides, the deformation of the power roller is thus suppressed, and therefore at the time of driving the transmission, a point of contact between the input disk and the power roller, as well as a point of contact between the output disk and the power roller, is less liable to be displaced, and therefore the loss of transmission of the power from the input disk to the output disk decreases, so that the transmission of the power from the input disk to the output disk is effected smoothly.

Furthermore, the deformation of the insertion hole is also suppressed as a result of suppression of the deformation of the power roller, and therefore the second radial bearing and the inner peripheral surface of the insertion hole in the power roller are kept substantially parallel to each other, so that a resistance of the second radial bearing to the inner peripheral surface of the insertion hole is reduced. Therefore, the power transmission loss at the second radial bearing decreases, and the transmission of the power by the second radial bearing is effected smoothly.

In the present invention, the outer ring and the displacement shaft are formed integrally with each other, and therefore as the outer ring is pressed in the direction of the axis of the displacement shaft upon application of a thrust force thereto at the time of driving the transmission, the displacement shaft is also pressed in this axial direction, and therefore the displacement shaft is less liable to be inclined. Therefore, the radial load is less liable to act on the rolling elements of the thrust bearing, so that the power transmission loss at the thrust bearing decreases, and the transmission of the power by the thrust bearing is effected smoothly.

In the present invention, the power transmission loss of the thrust bearing and the power transmission loss of the first radial bearing, which are caused by the deformation of the trunnion, are decreased, and the power transmission loss of the thrust bearing, the power transmission loss of the second radial bearing and the loss of transmission of the power from the input disk to the output disk, which are caused by the deformation of the power roller, are decreased, and furthermore the power transmission loss of the thrust bearing due to the inclination of the displacement shaft is reduced. Therefore, the power transmission can be smoothly effected at each of these portions, and therefore the power transmission efficiency of the toroidal-type continuously variable transmission can be enhanced.

And besides, the support hole and the insertion hole are closed by the first and second bottom plate portions, respectively, and therefore it is not necessary to provide retainer rings or the like which prevent the support shaft portion and pivot shaft portion of the displacement shaft from being withdrawn respectively from these holes. Therefore, the number of the component parts can be reduced, and besides assembling errors can be reduced. Furthermore, since the displacement shaft and the outer ring are formed integrally with each other, the processing of fitting portions of the displacement shaft and outer ring does not need to be effected.

Furthermore, it is not necessary to increase the size of the trunnion and power roller in order to suppress the deformation of the trunnion and power roller, and therefore the compact design of the toroidal-type continuously variable transmission can be achieved.

In the present invention of a second aspect, the trunnion further has a pair of wall portions formed on an inner surface side thereof, the wall portions being extending substantially perpendicularly to the inner surface of the trunnion so as to form a pocket portion for receiving the power roller, and the wall portions are interconnected by an interconnecting member.

In the present invention, the wall portions of the trunnion are interconnected by the interconnecting member, and therefore the inner surface of the trunnion is less liable to be deformed into a concave shape. Therefore, the power transmission loss of the thrust bearing and the power transmission loss of the first radial bearing, which are caused by the deformation of the trunnion, are further decreased.

In the present invention of a third aspect, the displacement shaft further has a stopper portion on the pivot shaft portion for preventing the second radial bearing from moving in a axial direction of the pivot shaft portion, the stopper portion being formed integrally with the pivot shaft portion.

In the present invention, the stopper portion for preventing the movement of the second radial bearing is formed integrally on the displacement shaft, and therefore it is not necessary to provide a separate stopper member for preventing the movement of the second radial bearing, and therefore the number of the component parts is further reduced.

DETAILED DESCRIPTION OF THE PREFERRED EMBODIMENTS

Figure 3:
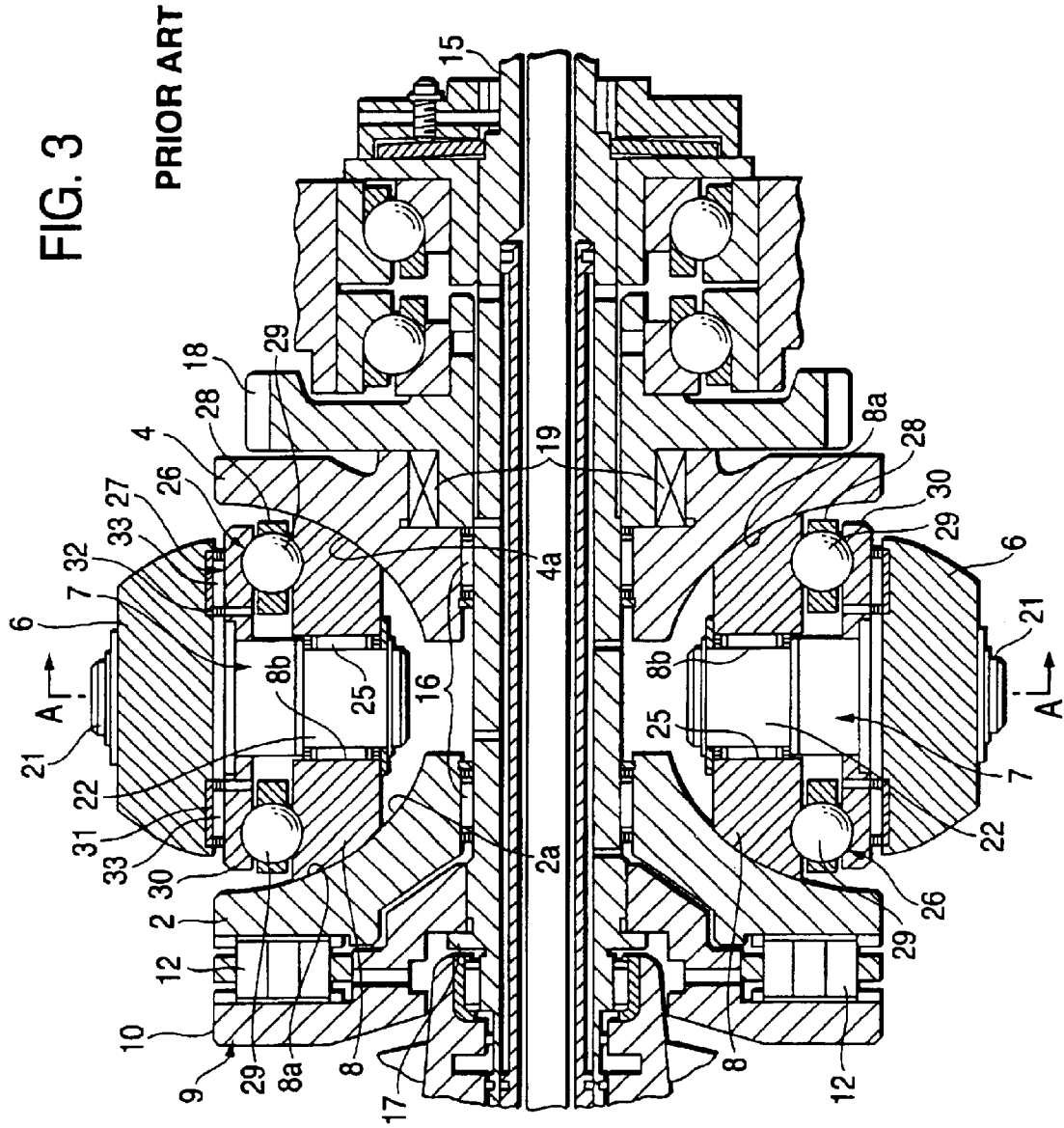
FIG. 3 is a cross-sectional view showing a conventional toroidal-type continuously variable transmission.
Figure 4:
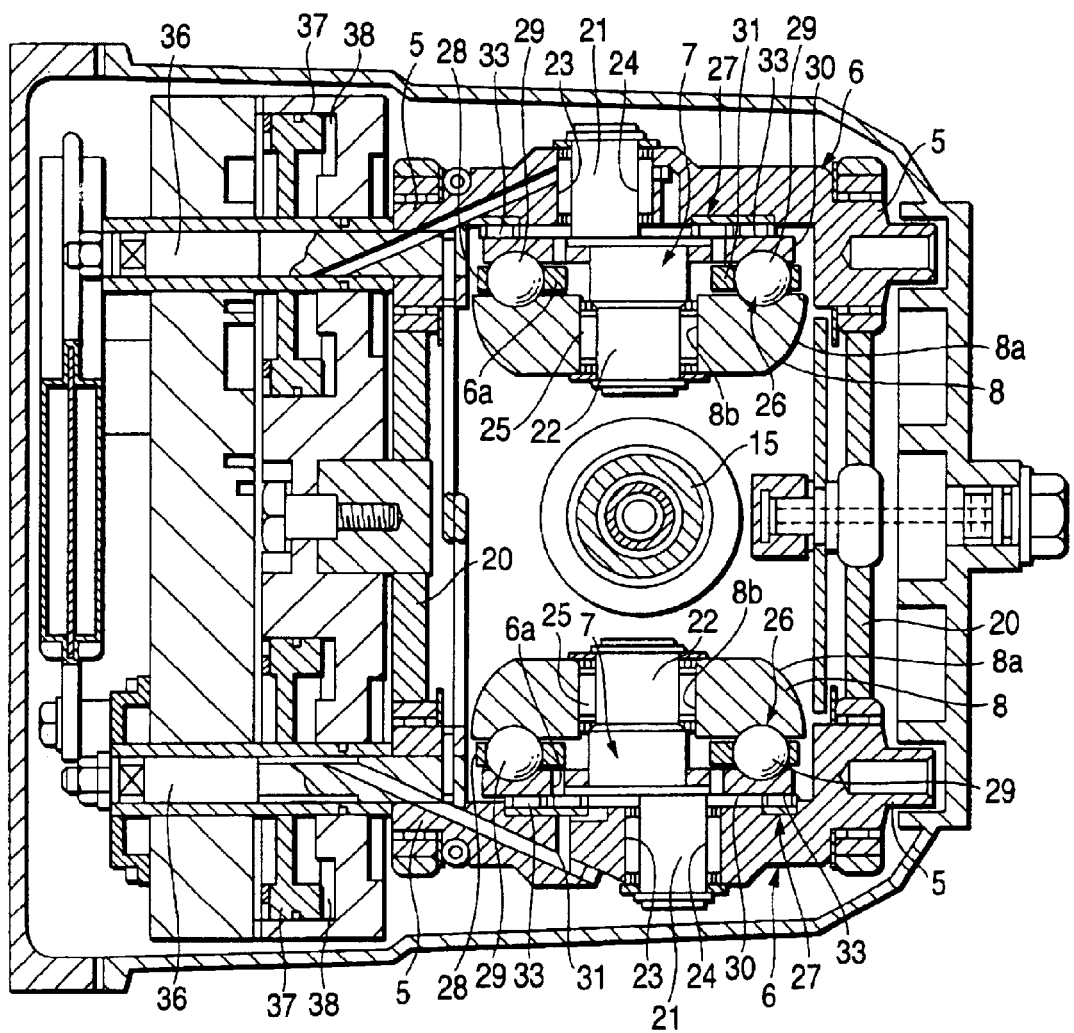
FIG. 4 is a cross-sectional view taken along the line A—A of FIG. 3.
Figure 5:
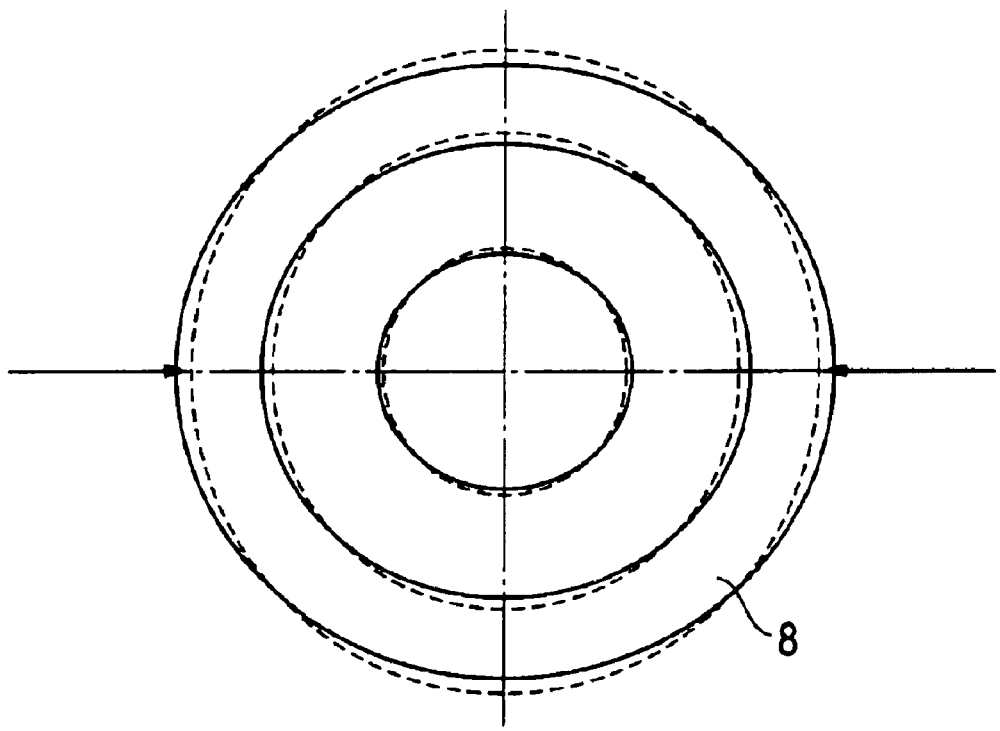
FIG. 5 is a view showing a deformed condition of a conventional power roller.

A preferred embodiment of the present invention will now be described with reference to the accompanying drawings. Those constituent elements, similar to those of FIGS. 3 and 4, will be designated by identical reference numerals, respectively, and explanation thereof will be simplified.

Figure 1:
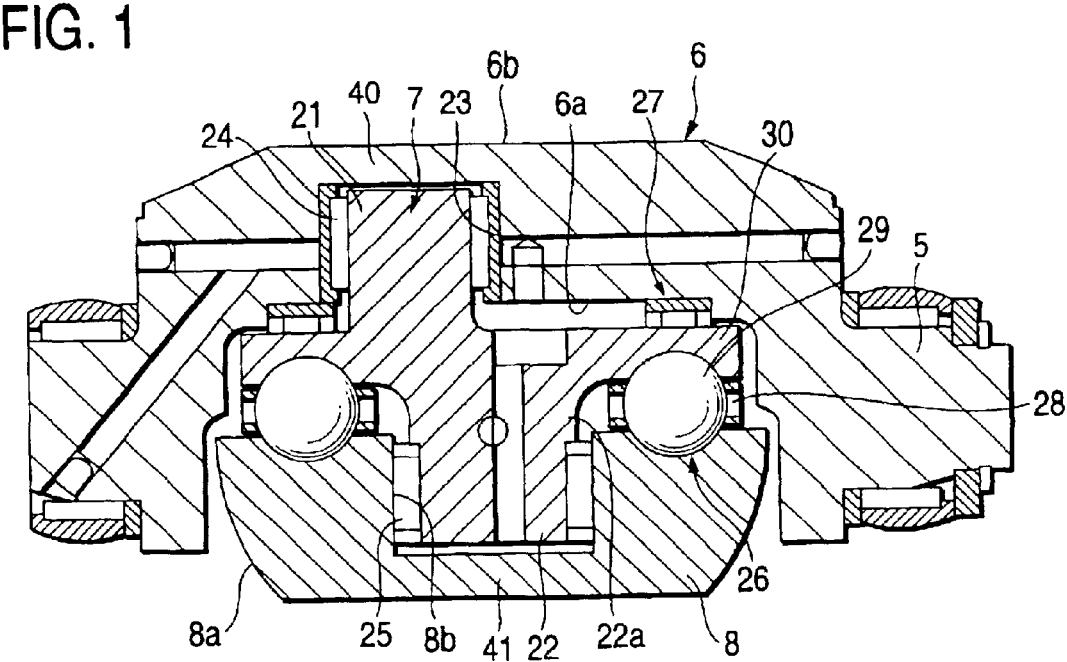
FIG. 1 is a cross-sectional view showing a first embodiment of the present invention.

FIG. 1 shows the first embodiment of the present invention. As shown in this Figure, a support hole 23 with a closed bottom is formed in a trunnion 6, and serves to rotatably support a support shaft portion 21 of a displacement shaft 7. Namely, a first bottom plate portion 40 is provided at that end of the support hole 23, disposed close to an outer surface 6b of the trunnion 6, and is formed integrally with the trunnion 6, and an opening in the support hole 23 in the trunnion 6 is closed by this first bottom plate portion 40.

An insertion hole 8b with a closed bottom is formed in a power roller 8, and serves to receive a pivot shaft portion 22 of the displacement shaft 7. Namely, a second bottom plate portion 41 is provided at that end of the insertion hole 8b remote from an outer ring 30, and is formed integrally with the power roller 8, and an opening in the insertion hole 8b in the power roller 8 is closed-by this second bottom plate portion 41.

The outer ring 30, cooperating with the power roller 8 to hold balls 29 therebetween, is disposed between an inner surface 6a of the trunnion 6 and the power roller 8, and is formed integrally with the displacement shaft 7.

A step portion (stopper portion) 22a is formed integrally on the pivot shaft portion 22 of the displacement shaft 7, and this step portion 22a and the second bottom plate portion 41, closing the insertion hole 8b in the power roller 8, prevent a second radial bearing 25 from moving in a direction of the axis of the pivot shaft portion 22.

In a toroidal-type continuously variable transmission of the above construction, there is provided the first bottom plate portion 40 which closes the opening in the support hole 23 in the trunnion 6, and therefore as compared with the case where the support hole 23 is in the form of a through hole, the deformation of the trunnion 6 is suppressed at the time of driving the transmission, and therefore the outer ring 30 is less liable to be inclined relative to the trunnion 6, so that a load, acting on the balls 29 of a thrust bearing 26, is substantially uniform. As a result, the balls 29 rotate smoothly, so that a power transmission loss at the thrust bearing 26 decreases, and therefore the transmission of the power by the thrust bearing 26 is effected smoothly.

And besides, the deformation of the support hole 23 is also suppressed as a result of suppression of the deformation of the trunnion 6, and therefore a first radial bearing 24, provided in the support hole 23, and the support shaft portion 21, supported by this radial bearing 24, are kept substantially parallel to each other, so that the first radial bearing 24 uniformly contacts the support shaft portion 21. Therefore, a resistance of the first radial bearing 24 to the support shaft portion 21 is reduced, so that the a power transmission loss at the first radial bearing 24 decreases, and the transmission of the power by the first radial bearing 24 is effected smoothly.

In this embodiment, there is provided the second bottom plate portion 41 which closes the opening in the insertion hole 8b in the power roller 8, and therefore as compared with the case where the insertion hole 8b in the form of a through hole, the deformation of the power roller 8 is suppressed. Therefore, the load, acting on the balls 29 of the thrust bearing 26, is substantially uniform, so that the power transmission loss at the thrust bearing 26 decreases, and the transmission of the power by the thrust bearing 26 is effected smoothly.

And besides, the deformation of the power roller 8 is suppressed, and therefore at the time of driving the transmission, a point of contact between an input disk 2 and the power roller 8, as well as a point of contact between an output disk 4 and the power roller 8, is less liable to be displaced, and therefore the loss of transmission of the power from the input disk 2 to the output disk 4 decreases, so that the transmission of the power from the input disk 2 to the output disk 4 is effected smoothly.

Furthermore, the deformation of the insertion hole 8b is also suppressed as a result of suppression of the deformation of the power roller 8, and therefore the inner peripheral surface of the insertion hole 8b and the second radial bearing 25 are kept substantially parallel to each other, so that the inner peripheral surface of the insertion hole 8b uniformly contacts the second radial bearing 25. Therefore, a resistance of the second radial bearing 25 to the insertion hole 8b is reduced, so that the power transmission loss at the second radial bearing 25 decreases, and the transmission of the power by the second radial bearing 25 is effected smoothly.

In this embodiment, the outer ring 30 and the displacement shaft 7 are formed integrally with each other, and therefore there is not encountered a situation in which the outer ring 30 and the displacement shaft 7 shake relative to each other at their fitting portions. And besides, as the outer ring 30 is pressed in the direction of the axis of the displacement shaft 7 upon application of a thrust force thereto at the time of driving the transmission, the displacement shaft 7 is also pressed in this axial direction, and therefore the displacement shaft 7 is less liable to be inclined. Therefore, the radial load is less liable to act on the balls 29 of the thrust bearing 26, so that the power transmission loss decreases, and the transmission of the power by the thrust bearing 26 is effected smoothly.

In this embodiment, thus, the power transmission loss of the thrust bearing 26 and the power transmission loss of the first radial bearing 24, which are caused by the deformation of the trunnion 6, can be decreased. And besides, the power transmission loss of the thrust bearing 26, the power transmission loss of the second radial bearing 25 and the loss of transmission of the power from the input disk 2 to the output disk 4, which are caused by the deformation of the power roller 8, can be decreased. Furthermore, the power transmission loss of the thrust bearing 26 due to the inclination of the displacement shaft 7 can be reduced.

Therefore, the power transmission can be smoothly effected at each of these portions, and therefore the power transmission efficiency of the toroidal-type continuously variable transmission can be enhanced. And besides, the deformation of the trunnion 6 and power roller 8 can be suppressed without the need for increasing the size of the trunnion 6 and power roller 8, and therefore the compact design of the toroidal-type continuously variable transmission can be achieved.

Since the support hole 23 and the insertion hole 8b are closed by the first and second bottom plate portions 40 and 41, respectively, it is not necessary to provide retainer rings or the like which prevent the support shaft portion 21 and the pivot shaft portion 22 from being withdrawn respectively from the holes 23 and 8b. Therefore, the number of the component parts can be reduced, and besides assembling errors can be reduced.

Furthermore, by forming the displacement shaft 7 and the outer ring 30 integrally with each other, the processing of the fitting portions of the displacement shaft 7 and outer ring 30 can be omitted.

In this embodiment, the step portion 22 for preventing the movement of the second radial bearing 25 is formed integrally on the pivot shaft portion 22 of the displacement shaft 7, and therefore it is not necessary to provide a separate stopper member for preventing the movement of the second radial bearing 25, and therefore the number of the component parts can be further reduced.

Figure 2:
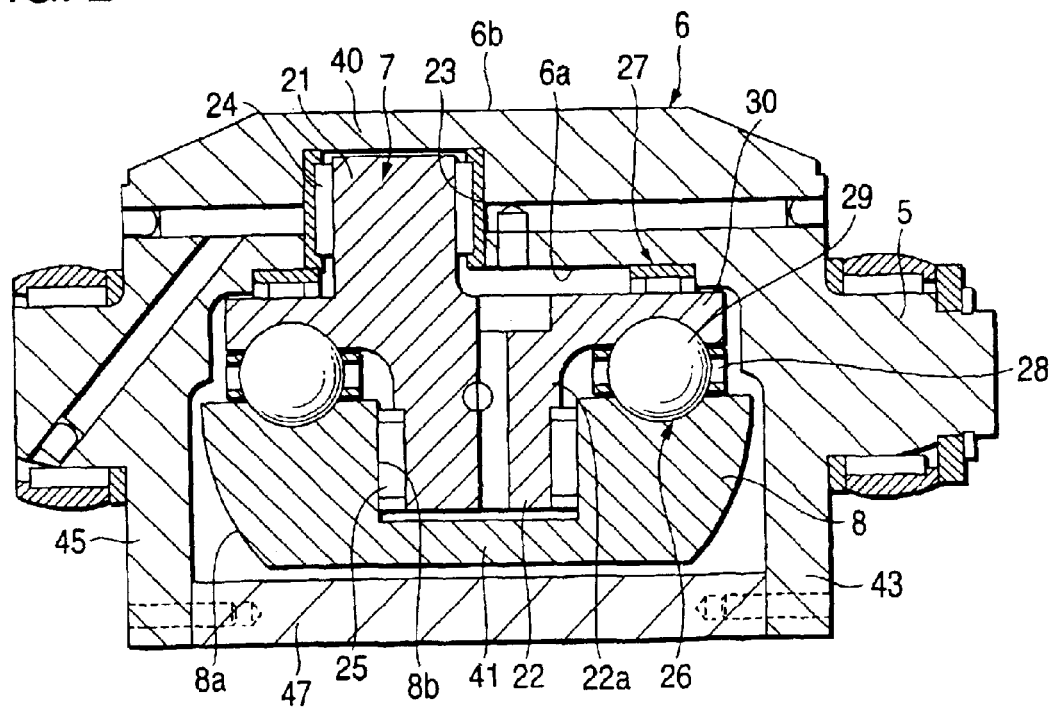
FIG. 2 is a cross-sectional view showing a second embodiment of the present invention.

FIG. 2 shows a second embodiment of the present invention. In this embodiment, those constituent portions, identical to those of the first embodiment, will be designated by identical reference numerals, respectively, and explanation thereof will be simplified.

In this embodiment, as shown in FIG. 2, a pair of wall portions 43 and 45 are formed on that side of a trunnion 6 having an inner surface 6a thereof, and-extend perpendicularly to the inner surface 6a to form a pocket portion for receiving a power roller 8. These wall portions 43 and 45 are interconnected by an interconnecting member 47, and prevent the inner surface 6a of the trunnion 6 from being deformed into a concave shape.

In this embodiment of the above construction, the deformation of the trunnion 6 is further suppressed, and therefore a power transmission loss of a thrust bearing 26 and a power transmission loss of a first radial bearing 24, which are caused by the deformation of the trunnion 6, can be further decreased, so that the power transmission efficiency of this toroidal-type continuously variable transmission can be further enhanced.

The present invention is not limited to the above embodiments, and various modifications can be made without departing from the scope of the present invention.

For example, in the above embodiments, although the first bottom plate portion 40 of the trunnion 6 is formed by an integral portion of the trunnion 6, this bottom plate portion may be replaced by a separate member which closes the opening in the support hole 23 in the trunnion 6. This can be applied similarly to the second bottom plate portion 41 of the power roller 8.

In the above embodiments, the displacement shaft 7 and the outer ring 30 are formed integrally with each other, using one member, the displacement shaft 7 and the outer ring 30 may be separate from each other, in-which case the outer ring 30 is fixedly secured to the displacement shaft 7 to provide a unitary construction.

As described above, in the present invention, the power transmission loss of the thrust bearing and the power transmission loss of the first radial bearing, which are caused by the deformation of the trunnion, can be decreased. And besides, the power transmission loss of the thrust bearing, the power transmission loss of the second radial bearing and the loss of transmission of the power from the input disk to the output disk, which are caused by the deformation of the power roller, can be decreased. Furthermore, the power transmission loss of the thrust bearing due to the inclination of the displacement shaft can be reduced. Therefore, the power transmission can be smoothly effected at each of these portions, and therefore the power transmission efficiency of the toroidal-type continuously variable transmission can be enhanced. And besides, it is not necessary to increase the size of the trunnion and power roller in order to suppress the deformation of the trunnion and power roller, and therefore the compact design of the toroidal-type continuously variable transmission can be achieved.

The support hole and the insertion hole are closed by the first and second bottom plate portions, respectively, and therefore it is not necessary to provide retainer rings or the like which prevent the support shaft portion and pivot shaft portion of the displacement shaft from being withdrawn respectively from these holes. Therefore, the number of the component parts can be reduced, and besides assembling errors can be reduced. Furthermore, since the displacement shaft and the outer ring are formed integrally with each other, the processing of the fitting portions of the displacement shaft and outer ring does not need to be effected.

In the present invention, the wall portions of the trunnion are interconnected by the interconnecting member, and therefore the deformation of the trunnion can be further suppressed. Therefore, the power transmission loss of the thrust bearing and the power transmission loss of the first radial bearing, which are caused by the deformation of the trunnion, can be further decreased, and the power transmission efficiency of the toroidal-type continuously variable transmission can be further enhanced.

In the present invention, the stopper portion for preventing the movement of the second radial bearing is formed integrally on the displacement shaft, and therefore it is not necessary to provide a separate stopper member for preventing the movement of the second radial bearing, and therefore the number of the component parts can be further reduced.

What is claimed is:

1. A continuously variable transmission, comprising:

an input shaft;

an input disk and an output disk each having an inner surface and concentrically mounted on the input shaft so as to rotate relative to each other, the inner surfaces thereof being opposed to each other;

a displacement shaft having a support shaft portion and a pivotal shaft portion, the support shaft portion and the pivotal shaft portion are eccentric with each other;

a trunnion having a support hole for rotatably supporting the support shaft portion of the displacement shaft, and swinging about a pivot shaft disposed in a twisted position with respect to the input shaft;

a first radial bearing rotatably supporting the support shaft portion of the displacement shaft within the support hole of the trunnion;

a power roller having an insertion hole for receiving the pivot shaft portion of the displacement shaft, and disposed between the input disk and the output disk;

a second radial bearing rotatably supporting the pivot shaft portion within the insertion hole of the power roller; and a thrust bearing including an outer ring disposed between the power roller and the trunnion, and rolling elements held between the outer ring and the power roller, and bearing a thrust load acting on the power roller, wherein a first bottom plate portion is provided at the support hole of the trunnion so as to close an opening of the support hole;

wherein a second bottom plate portion is provided at the insertion hole of the power roller so as to close an opening of the insertion hole;

wherein the displacement shaft and the outer ring are formed integrally with each other; and wherein the trunnion further has a pair of wall portions formed on an inner surface side thereof, the wall portions being extending substantially perpendicularly to the inner surface of the trunnion so as to form a pocket portion for receiving the power roller, and the wall portions are interconnected by an interconnecting member.

2. The continuously variable transmission according to claim 1, wherein the displacement shaft further has a stopper portion on the pivot shaft portion for preventing the second radial bearing from moving in a axial direction of the pivot shaft portion, the stopper portion being formed integrally with the pivot shaft portion.

* * * * *